July 26, 1960 R. J. CALLENDER 2,946,847

STRUCTURE FOR CONTROLLING BAND WIDTH

Filed April 30, 1956

INVENTOR
RUSSEL J. CALLENDER
BY Alton V. Oberholtzer
ATTORNEY

United States Patent Office 2,946,847

Patented July 26, 1960

2,946,847

STRUCTURE FOR CONTROLLING BAND WIDTH

Russell J. Callender, 417 University Ave., St. Paul, 3, Minn.

Filed Apr. 30, 1956, Ser. No. 581,595

13 Claims. (Cl. 178—5.8)

Figure 1:
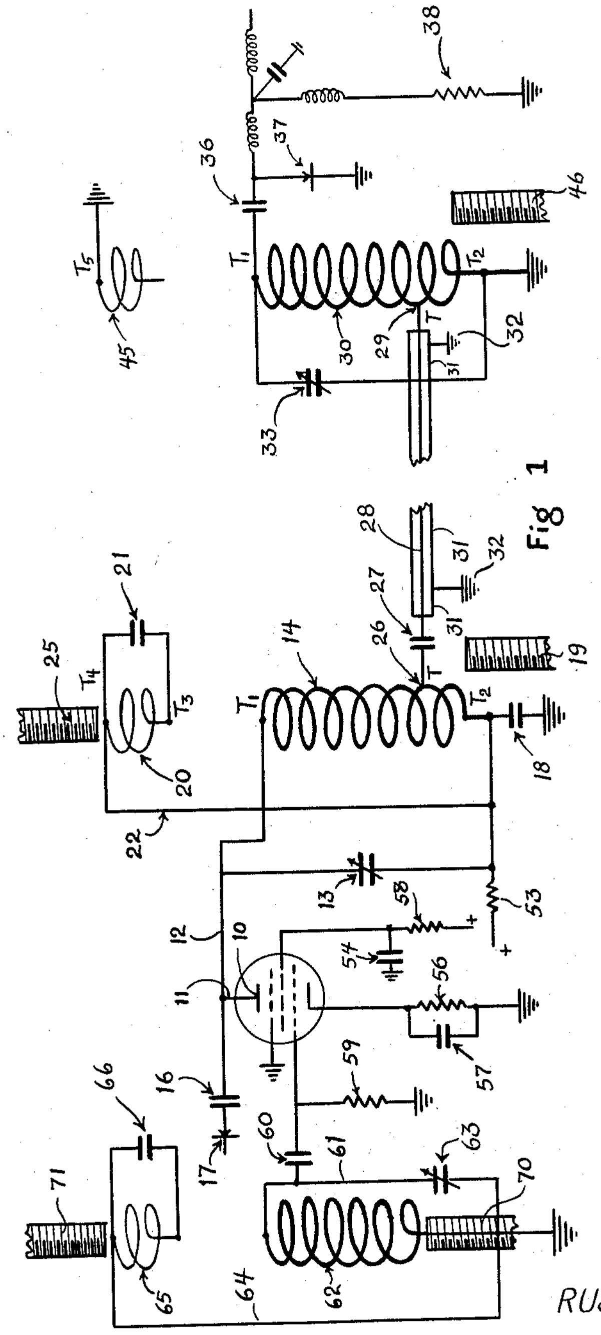

This invention relates to a method and structure for controlling band width in conjunction with a controlled slope at the picture carrier's side and the sound carrier side of a resultant response curve of an I.F. circuit of a one stage picture strip, or of a multiple stage strip with each stage having the same band width, and relates to phase correction of picture carrier's side bands. More particularly, the invention relates to prephased correction of picture video intelligence and improvement in picture detail and resolution with an improved intercarrier sound take-off and improved rejection of sound interference in the picture display, with complete elimination of all frequency band pass adjacent to the band pass filter tuning range by the combined properties of a low impedance coaxial transmission line connecting, or inter-connecting, tuning coils as a band pass filter arrangement. The band pass filter arrangement controls a one stage band pass, an output band pass stage or a multiple band pass stage coupled by the band pass arrangement and relatively controls the slope of the high and low frequency sides of the resultant response curve allowing the picture carrier to be placed on the response curve near the base line of the high frequency side of the response curve, allowing the picture carrier's side bands to produce higher video amplitude upon rectification of picture carrier's side bands and to extend to sound carrier limit with a sharp slope to fall to the sound carrier's frequency.

In previous arrangement, the band pass control has been by the use of staggering I.-F. amplifiers to obtain large passage of frequency band width and relative independent turning of each amplifier with the resultant stages to obtain a wide band pass and employment of resistors across coils of amplifiers.

Accordingly, it is an object of this invention to provide a method of utilizing a band pass arrangement for obtaining a controlled band width with control of the degree of response curve slope at the picture carrier side of the response curve.

Another object of this invention is to provide control of the degree of slope at the sound carrier side of a response curve, control of the frequency range of all frequency between two limits for relative control of the picture carrier's side bands and to control the amplitude of the sound carrier output by controlling the coupling factor of a coil arrangement in conjunction with control of amplitude of response curve output.

Another object of this invention is to provide a method of controlling and increasing the phase correcting factor or correction of the phase shift factor or a prephase correction of picture carrier side bands by a band pass filter providing controlled band width characteristics with relative control of the side bands thereof.

An additional object of this invention is to provide a method of producing a prephase correction of the picture carrier's side bands through a band pass filter improving picture detail and picture resolution of the contrast range thereof.

Another object of this disclosure is to provide a coil arrangement connected by a transmission line as a band pass filter for the transmission and control of a picture carrier side bands in a single output stage for a picture strip.

An additional object of this invention is to provide the art with a method and structure for obtaining a band pass for the picture carrier's side bands with the input coil of the band pass filter arrangement establishing both the high frequency limit and the low frequency limit of the resultant response curve with the output coil tuned to coincide in frequency range with the input coil and with a low impedance transmission line connected to a tap point on each coil with an iron core inserted at the tap end to effect a change of inductance at the ground end of coil to the tap, said inductance value controlling the band pass width characteristics individually or together and relatively controlling band pass amplitude by each increase in band width reducing amplitude of total band pass.

An additional object of this invention is to provide the art with a method and structure for obtaining wide frequency band pass width with an input resonant coil of the band pass filter arrangement establishing the high frequency limit of the resultant response curve and the output resonant coil the low frequency limit of the resultant response curve for affecting band pass characteristics with a low impedance transmission line connected to a tap on each coil with the inductive magnitude across each end of the transmission line establishing minimum frequency band pass characteristics.

An additional object of this invention is to provide the art with a method and structure for obtaining slope angle control by magnetically and electrostatically coupling a high capacitive reactance resonant circuit to the input resonant tap coil of the band pass filter with the output tap coil tuned in frequency to coincide with the input coil's frequency range in which the energy is reflected from the high capacity resonant circuit to the band pass filter's frequency range of a resultant response curve of two tap coils connected together by a low impedance transmission line.

Another object of this invention is to give the art a method and structure of a band pass filter output stage to be connected directly to a picture tube without the use of a video amplifier and by using transistor stages of the band pass filter arrangement with complete elimination of vacuum amplifiers.

Another object of this invention is to provide a method and structure for obtaining phase correction of video intelligence without ringing.

A further object of this invention is to provide for improved sound output by correlating amplitude of sound carrier to picture carrier on the resultant response curve with a circuit which resonates near the frequency range of sound channel I.-F. for the rejection of sound interference in picture display and a more favorable reduction in amplitude of sound I.-F. carrier frequency to beat with the picture carrier to produce the required mc. intercarrier sound output.

Further objects and advantages will be apparent from the following description in conjunction with the accompanying drawings, wherein:

Figure 1 is a schematic illustration of the structural arrangement embodied in this disclosure coupled with a grid circuit.

Figure 2:
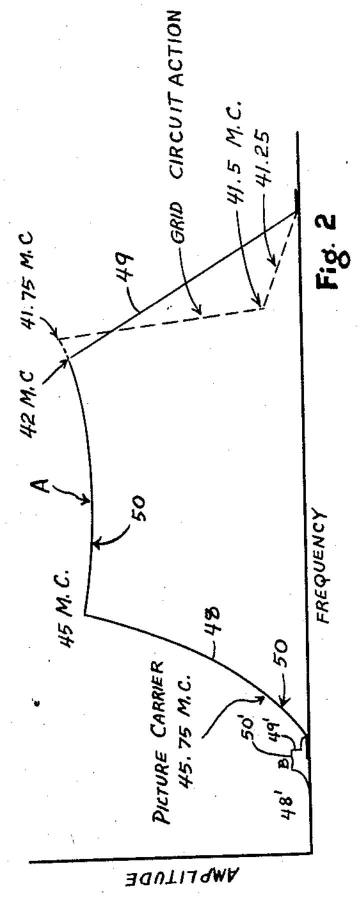

Figure 2 a graph illustrating a resultant whole response curve and an image thereof obtained by the structural arrangement of Figure 1.

From the following discussion and description, it will be recognized that an improvement in picture detail is provided by control of the degree of slope and band width and correction of phase shift to reproduce picture information with improved detail and resolution.

With reference to the arrangement shown in Figure 1, the energy of the picture carrier and sound carrier is transferred from the plate 10 of a circuit, for example, a 6CB6 tube. The plate 10 is connected to the sound circuit side of a conventional receiver unit by conductor 11. The conductor 11 is connected to conductor 12 which leads, on the one side, into a resonant circuit represented by the variable capacitor 13, and an input coil 14, and on the other side to an intercarrier sound system through capacitor 16 and diode 17. As hereinafter illustrated, the diode 17 produces a 4.5 mc. sound beat note as the result of mixing I.-F. sound carried and I.-F. picture carrier. The capacitor 13 is coupled across the first coil 14 and grounded through capacitor 18 connected at the low impedance end $T_2$ of the coil 14. In this arrangement, the energy of the picture carrier at plate 10 is transferred as a tuned plate circuit to coil 14, to resonate at a 40 to 50 megacycle picture intermediate frequency, for example, under the control or action of capacitor 13 across coil 14 and core 19 inserted at the low impedance side of coil 14.

Inductively coupled and in facing relationship to the high impedance side $T_1$ of coil 14 is the high impedance side $T_3$ of coil 20. The coils 14 and 20 are inductively coupled electromagnetically and electrostatically. Both coils 14 and 20 are wound in the same direction and coil 20 is coupled about one-eighth inch from coil 14, or close enough to coil 14 so that coil 20 starts to have the effect of a brass slug on coil 14 and reduces the inductance at the high impedance end of coil 14. A fixed capacitor 21 is coupled across the low impedance end $T_4$ and the high impedance end $T_3$ of tuning coil 20 and the low impedance side $T_4$ of coil 20 and $T_2$ of coil 14 are connected together by conductor 22. The coil 14 in conjunction with coil 20 provides a tuned circuit to primarily form and control the high frequency and picture carrier side, or degree of slope angle of the resultant response curve. The coil 14, in conjunction with coil 20, in a limited way reduced the width of the band pass, or the characteristic width of the resultant response curve, in the manner as hereinafter will be apparent. That is, when center frequency is higher, as controlled by coil 20, and is tuned by core 25 toward the frequency range of coil 14, the band pass range of the response curve will increase the correcting factor of video intelligence in the picture carrier side band, in a limited way, and limits side band ringing. Such tuning also results in a controlled steeper slope at the high frequency side of the response curve, or on the picture carrier's side, as is hereinafter illustrated and when output coil 30 circuit frequency is tuned to input coil 14 circuit frequency range, phase shift factor is corrected in resultant video intelligence. Thus, the resonant coil 20 with relative high capacity condenser 21, in relationship with coil 14 and coil 30 controls the energy of the response curve between the high frequency end of the curve and the low frequency end of the curve to increase the picture brightness and detail with simultaneous prephasing of the video information through regulation of the picture carrier side bands.

In reference to coil 14, capacitor 13, or on coil 14 at about a turn and one-half to two turns from the low impedance end $T_2$ of coil 14, is a transmission line tap 26 connected, through blocking capacitor 27, to a non-reactive transmission line 28. The transmission line 28 is one in which no reflections of energy are apparent or the same capacitive or inductive reactance is present at each end. The energy of the picture carrier side bands is transferred through line 28 and transmission line tap 29 to coil 30 at point T about a turn and one-half to two turns from the low impedance end $T_2$ of coil 30. The blocking capacitor 27 serves to isolate B plus and the transmission line 28 may be of any desired length. This serves to space the input coil 14 and output coil 30 in completely isolated relationship electrostatically and electromagnetically. The casing 31 on line 28 is grounded at the ends as at 32.

The opposite end of the transmission line 28 is connected by the line tap 29 to the coil 30 at about a turn and one-half to two turns from the low impedance end of the coil 30. This transmission line 28 is the only means of connecting and converting energy from coil 14 to coil 30. The band pass factor of the coils 14, 20, and 30 and line 28 is of a high frequency characteristic or arrangement with reference to circuit losses. The coil 30 has connected across its low impedance side, which is grounded at $T_2$, to its high impedance side $T_1$, a variable capacitor 33. The variable capacitor 33 and coil 30 are primarily tuned to coincide in frequency range of coil 14 and capacitor 13 for high degree phase correction and relatively tunes all the picture carrier's side bands. Co-jointly, the coil 14 and capacitor 13, in conjunction with coil 20 and capacitor 21, and coil 30 and capacitor 33 relatively tunes all side bands of the picture carrier.

A coupling capacitor 36 connects the high impedance side $T_1$ of coil 30 with the video rectifier 37 and output and the load resistor 38 where the resultant response curve is measured.

While coil 30 is relatively electrically the same as coil 14, it is preferable to electrostatically shield the same at the high impedance end $T_1$ by a small coil 45. The small coil 45 is similarly wound in slightly spaced relationship, for example, one-eighth inch, to the high impedance end $T_1$ of coil 30 and is grounded on the low impedance end $T_5$.

Iron cores 19 and 46 are inserted in the low impedance ends $T_2$ of coils 14 and 30 respectively. That is, the iron core 19 is adapted to be adjustably mounted within the low impedance end of coil 14. The iron core 19 aids in tuning the plate circuit in coil 14 and increases the inductance at the low impedance end $T_2$ of the coil 14. The iron core 46 similarly assists in tuning the coil 30 and each of the cores increases the inductance at the low impedance ends of their respective coils at T, or line taps 26 and 29 on coils 14 and 30, respectively. Thereby, the cores 19 and 46 change the inductance of coils 14 and 30, respectively, from points T to $T_2$ more than at any other part of the coils. This increase in inductance has the property of being equivalent to moving the line taps 26 and 29, or from T, to nearer the middle of the coil and increases and controls the width of the band pass or widens the frequency range of the filter, and provides a band width of frequencies which are substantially flat and of equal amplitude. As indicated, the cores 19 and 46 are adjustable to provide for proper band width. Any movement of the cores 19 and 46 will relatively increase or decrease the relative frequency range of the coils 14 and 30, respectively, but this shift of frequency movement can be corrected by capacitor 13 of coil 14 and capacitor 33 of coil 30.

In an arrangement of the character as above described, for example, the capacitors 13 and 33 have a variable capacity of from 8 to 16 micromicrofarads (mmfd.), the capacitor 21 is 56 mmfd. and capacitor 36 is 5 mmfd. A relative response curve as illustrated in Figure 2 is obtained and it is to be understood that the carrier side bands and the picture band pass is expressed in equivalent terminology. The capacitors in this band pass filter are of the ceramic type.

It is believed that the relative operation of the band pass filter in prephasing the video information by controlling the energy in the response curve between the high frequency end of the curve and the low frequency end of the curve, with respect to relatively regulating the picture carrier side bands, will be more clearly understood from the following description relative to the response curve graph shown in Figure 2. As indicated, the phase correction property for obtaining clearer video intelligence relates to controlled band width characteristics with controlled slope, as illustrated at the picture carrier side 48 of the response curve A. In the present structural arrangement, as described, a pre-phase correction of the video information is produced when the relative tuning properties of the connected coils of the band pass filter arrangement are properly adjusted to affect band width characteristics and tune both sides of the response curve A.

The coil 14, with coil 20, is a tuned circuit which affects the low frequency side bands of carrier slope 48 of the response curve A and when properly tuned with coil 30, relatively controls the high frequency side bands of response curve side 49. That is, when the center frequency of coil 20 is higher and is tuned by capacitor 21, toward the frequency range of coil 14, the resultant angle of slope 48, representing the high frequency side of the response curve A becomes steeper with limited correcting factor of the video intelligence, up to a certain point. This adjustment also limits side band ringing while slightly reducing the band pass frequency range of the two coils 14 and 30, as represented by response curve band width 50. This makes it possible to improve picture detail and resolution by placing the picture carrier at the base of the resultant response curve slope, for example, at 45.75 mc. point and choosing and adjusting the angle of the slope by the action of coil 20 on coil 14, and action of coil 30 on coil 14 for phase correction in a more complete control.

For example, when the coils 14 and 30, in conjunction with their capacitors 13 and 33, respectively, are properly adjusted to the same frequency range, a maximum band width with clearer picture information and detail are obtained; each respective coil and capacitor 13, 14 and 30, 33, act as one coil to tune the whole curve on both sides or both the high and low frequency sides, and with the slope 48 has a frequency range of about .75 megacycle from the top of the curve A to the beginning of the point 50, which is the picture carrier side of the response curve A. Thus, it will be recognized that in the connected coil and transmission line arrangement, as herein described, the picture carrier position is near the base line of the resultant response curve, the slope of which is controlled by the action of coil 20 and capacitor 21 tuned so its center frequency is higher in frequency and near the frequency range of coil 14 and capacitor 13. In this relationship, the coil 14 tunes both sides of the response curve, for phase correction, coil 30 tunes both sides of the response curve and coil 14, in conjunction with coil 20 tunes the slope of the picture carrier side of the response curve. With coil 14 and coil 30 tuning both sides of the response curve, the band width can be controlled by positioning of the respective taps 26 and 29, separately or together, toward the middle of each or both of their relative coils for greater band pass. The effect of utilizing the taps 26 and 29 near the base of the coils, adjacent the core inserts 19 and 46, has the equivalent property of moving the taps nearer the middle of the coils, as described, increases the frequency range and makes the band pass wider with frequency range between slopes of relative equal amplitude and all frequencies in the band pass, as illustrated in the resultant response curve graph. Alternately, as indicated, the one or both iron cores 19 and 46 will vary the inductive value between relative points $T_2$ and $T_1$, by variable adjustment in their relative coils 14 and 30, respectively. Thereby, the band pass filter allows the use of a one stage for the picture strip with control of the band width while regulating the picture carrier's side bands to produce a correction of the phase of the rectified side bands.

Through control of the degree of slope, as described, and the frequency range of the coils and transmission line, some novel characteristics of the resultant response curve are produced. For example, one property of the band pass filter is obtained by tuning coil 14 to one frequency, for example 45 megacycles, and tuning coil 30 to an adjacent frequency, for example, 40 megacycles, obtaining a band width, as represented by the resultant response which will be all frequencies therebetween, with a flat response of these inbetween frequencies and with band width on the order of 6 mc. or so but with less amplitude. However, the phase correction property of clearer video intelligence will be lost if either coil will not individually tune frequency movement on both sides of the response curve in the output stage so arranged. Having the inductive values at the low impedance ends of the coils with the feature or inductance across the transmission line being in phase with the resonant circuits and all parts of the same inductance no lag or lead is present. With the in-phase inductance value at the transmission tap near the base of the coils, as described, an increased and greater phase correction is present when the coils 14 and 30 are tuned to the same frequency and produce relative frequency movement toward the low frequency side or the high frequency side of the band pass response curve. In very sensitive picture tube structure, phase correction is obtained without peaking coils and video amplifiers, utilized after the transmission of intelligence through the strip and can be eliminated.

When the band pass filter is mistuned, it has the property of reflecting an image much like that of a mirror and another response curve B adjacent in frequency to the main response curve A is obtained. The image curve B has the same shape as the response curve A but is of much less amplitude. For example, in the relative tuning of the coils 14 and 30, the coil 14, with coil 20 is a tuned circuit, as indicated, wherein center frequency controlled by coil 20 is higher in frequency and adjusted towards the frequency range of coil 14 to form and steepen the slope of the high frequency side of the resultant response curve. In addition, when coils 14 and 30 are tuned to adjacent frequencies a maximum band width is obtained, the coils do not track and there is no phase correction. However, a wide band pass of 6 to 8 mc. may be produced by tuning coils 14 and 30 to adjacent frequencies with a flat response curve, for example. Control of band pass width with phase correction, can be used in color equipment in a two stage strip to obtain gain, in the place of other structure now used as in 5 stage picture strip for color.

In tuning the frequency of coil 20 toward the frequency of coil 14, which obtains a reduction of band pass frequency and proper slope of the high frequency side of the response curve, the coil 20 can be mistuned to have the image B, of the response curve A, if any energy is bunched past the 45.75 towards the 46 megacycle point of the response curve. This image B of the response curve is at reduced amplitude adjacent to the frequency range of the band pass and indicates that the coil 20, with capacitor 21, center frequency is tuned too close to the same frequency of capacitor 13 and coil 14 and that there is, in effect, an overshot of the whole band pass curve, the overshot being at less amplitude than the tuned response curve of the coils 14 and 30 and transmission line 26. The image B is consequently a dual response curve as indicated by prime markings on B and is the result of mistuning the band pass. Thus, while the tuning effects of coil 14 and coil 30 both have an effect upon the picture carrier side bands, as well as the frequency range of the band pass filter, it will be recognized that improved picture detail is obtained by combining therewith a control of the slope characteristics of the band pass. Further, coil 30 can be unbalanced to produce the effects of ringing at load resistor 37, as a total effect, even if the response curve is satisfactorily obtained. This ringing appears to be produced by magnetically or electrostatically coupling a resonant circuit thereinto.

From the above description, it will be recognized that this arrangement of a band pass filter, properly tuned as a reflector and not a trap absorption arrangement, eliminates the necessity of shielding the output circuit and makes it possible to use a one-stage output picture strip with high efficiency high gain, adequate band width, adequate slope angle adjustment, and phase correction. By the above indicated control of band width and angle of slope adjustment on the picture carrier side of the response curve, there is illustrated the relative control of frequency range and both sides of the resultant response curve in a one stage output picture strip to reproduce picture information with improved detail and resolution. The band pass filter arrangement and its method can be employed wherever wide band pass or sharp band pass is required and wherever a resonant band pass filter is employed or required, i.e. other than an I.-F. picture strip, as with a transmitter amplifier, or as in an interstage coupling device.

By the above band pass filter arrangement, as described, it will be recognized that there is provided a method and structure wherein the reflected energy is added to the energy of the resonant circuit input tap coil, the high capacitive resonant circuit is tuned by insertion of an iron core and establishing a center frequency which when tuned nearer to the frequency range of the band pass filter's input and output tap coil, the angle of slope is increased in the resultant response curve. In the arrangement of output stage the high capacitive reactive resonant circuit is tuned to operate on the high frequency side of the resultant response curve thereby controlling the high frequency slope of the resultant response curve. The high capacitive reactance resonant circuit is inductively coupled at the high impedance end of the tap input coil of the band pass filter arrangement, and as the angle of slope is increased, the ringing of picture carrier side bands is balanced out or is damped out and is eliminated upon rectification of picture carrier's side bands on obtaining video intelligence in an output stage of this arrangement. The high capacitive reactance coil circuit and the input tap coil circuit have their low impedance sides connected together. Thus in tieing the whole arrangement together it will be recognized that slope, width and phase correction is obtained in tuning the system as a reflector and not as an absorption trap. When mistuned the whole arrangement gives the effect of an absorption trap and is no longer a reflector.

In the arrangement of two tap coils tuned to coincide in frequency range with a transmission line connecting them together, the phase correcting factor is apparent to a great degree in the resultant video intelligence.

In the grid circuit arrangement which provides improved and more favorable intercarrier sound output with regard to amplitude of sound carrier to picture carrier, coupled with the band pass filter for picture control, as illustrated, is a medium type LC grid circuit. This circuit produces a more favorable reduction in amplitude of sound I.-F. carrier frequency to beat with the picture carrier at a 4.5 mc. intercarrier sound output through diode 17. In this arrangement the 6CB6 tube is coupled with a plate current limiting resistor 53 of 3900 ohm value; a .0015 mf. screen by-pass capacitor 54; an 18,000 ohm screen limiting resistor 58, a 330 ohm cathode bias resistor 56, and a .0015 mf. cathode by-pass condenser 57. The grid is grounded through an 18,000 ohm grid return resistance 59 and coupled through a 150 mmfd. capacitor 60 to conductor 61. The conductor 61 is coupled to the high impedance side and to the low impedance side of signal input grid coil 62 through a 15 to 20 mmfd. noninductive (NPO) variable capacitor 63. The resonant circuits are provided with NPO ceramic capacitors.

The low impedance side of coil 62 is connected by conductor 64 to the low impedance side of a resonant coil 65 which in turn is connected across its high impedance side and low impedance side by a relatively high capacitive capacitor 66 of 79 mmfd. The coil 62, for example, is a space wound coil 1/4 inch in diameter of number 27 conductor wire with 26 threads to the inch. Coil 65, for example, is a space wound coil 1/4 inch in diameter space wound of Number 27 conductor wire of 4.25 turns, with 26 threads to the inch. The spacing between the relative high impedance ends of coils 62 and 65 is 1/16 inch to 1/8 inch. This coil spacing controls the sound carrier ratio to picture carrier for more favorable sound output.

The signal input grid coil 62 is tuned by variable capacitor 63 to admit a large band pass in conjunction with resistor 59 and is provided with the adjustable iron core 70 for tuning to the frequency range of the response curve. The coil 65 is provided with an adjustable iron tuning core 71. The action of the coil 65, tuning core 71 and capacitor 66 relative to coil 62 and capacitor 63 is similar to the action of coil 20, core 25 and capacitor 21 upon coil 14 and capacitor 13. The coil 65 reflects energy back to coil 62 increasing its amplitude and sharpening the slope of the resultant response curve at the low frequency side of the resultant response curve, as represented by the dotted line shown in the graph in Figure 2. In other words, the coil 65 with condenser 66 resonates near frequency range of sound channel I.-F. for the rejection of sound interference in picture display and for a more favorable reduction in amplitude of sound I.-F. carrier frequency to beat with the picture carrier frequency to produce the 4.5 mc. intercarrier sound output, and is positioned at 41.25 mc. point on the dotted lines in the graph. Thus, with an arrangement and method, as described, it has been found that improved intercarrier sound output is obtained as a result of mixing I.-F. sound carrier and I.-F. picture carrier in the combined reflector systems, as described.

In further explanation of the structure, as above described, there is provided a frequency range band pass resonant filter consisting of a resonant input tap coil with a high capacitive reactance resonant coil inductively coupled electromagnetically and electrostatically to the high impedance end of the input coil. One end of a low impedance coaxial transmission line is connected to the tap portion and to the low impedance end of the input coil, and the other end of the transmission line is connected to the tap portion and to the low impedance end of the out-put coil. The inductive magnitude across the tap portion of both input coil and output coil, at the low impedance ends of the two coils, controls the band pass frequency range and the band pass amplitude range of a band pass resonant filter, as illustrated by the resultant response curve thereof. In operation, the high capacitive reactance resonant coil center frequency is tuned to an adjacent higher frequency range than the band pass filter frequency range of the input resonant coil transmission line output coil in which the input tap coil circuit and the output tap coil circuit coincide in frequency range to produce a resultant response curve which displays a steep slope on both sides of its frequency range of the band pass filter in which the amplitude of all frequencies between the slopes are of equal or substantially equal height. That is, when each coil individually produces movement of frequency range of the resultant response curve; when a picture carrier and its side bands are inserted at the high frequency side of response curve and picture carrier is placed near to the base line of the resultant response curve of the band pass frequency range filter arrangement, and when energy of the picture carrier side bands is reflected from the high capacitive reactance resonant coil circuit to the input coil transmission line output coil band pass frequency range circuit and is included in the output of energy from the band pass filter circuit there is accomplished the control of the angle of slope of the high frequency side of the resultant response curve, the ringing factor, the phase correcting factor, contrast range factor increasing range of black and white picture contrast, and the production of clearer picture detail in the picture display.

Further, the high capacitive reactance resonant coil circuit when tuned to an adjacent higher center frequency range than the band pass frequency range of the input resonant coil, transmission line and output coil, then the high capacitive resonant coil circuit produces the effect of steepening and controlling the angle of slope of a resultant response curve in which the input coil circuit and the output coil circuit are tuned to adjacent frequency ranges and the inductive magnitude across the ends of the transmission line controls the minimum frequency range of the resultant response curve and input coil circuit and output coil circuit control the maximum frequency range of a resultant response curve.

In the combination there is provided a grid coil arrangement of an output stage of a band pass filter in which the grid coil resonant circuit capacitor value, in conjunction with resistor 59, is chosen to admit the same frequency range as a band pass filter frequency range. The grid circuit is an arrangement in which a high capacitive resonant circuit is inductively coupled electro-magnetically and electrostatically to the grid circuit. Its center frequency is tuned lower in frequency range than the grid coil circuit and is inductively coupled to the high impedance side of the grid coil circuit in which the degree of coupling of these two coils control the balance and amplitude of sound carrier to picture carrier energy for obtaining a beat frequency output for sound intelligence in the plate circuit by a diode mixer, and energy is reflected to the grid coil circuit from the high capacitive resonant coil circuit and is added to it upon insertion of picture carrier and side bands and sound carrier inputs to the grid coil circuit thereof.

In accordance with the patent statutes, I have described the principles of construction and operation of my band pass filter and method of improving picture detail with sound output, and while I have endeavored to set forth the best embodiment thereof, I desire to have it understood that changes may be made within the scope of the following claims without departing from the spirit of my invention and improvement.

I claim:

1. In the control of the range of amplitude of modulated components and range of amplitude of carrier in the separation of carrier and modulated components to control and increase the amplitude of the demodulated components from said carrier in their related amplitude relationship, a structure consisting of an input tapped turn inductor and an output tapped turn inductor with shunt condensers for each said inductor, said tapped turn inductors being connected and coupled by a transmission line at the tapped turn point and the beginning of turn of each inductor, with the input tapped turn inductor inductively coupled to a parallel inductor shunt condenser circuit, and a parallel shunt condenser inductor, means for inserting a carrier with modulated components, means for detecting modulated components, each tapped turn inductor tuned to produce simultaneously a slight frequency movement of the said structure frequency response range to establish a characteristic frequency range of said structure thereby keeping the modulated components of said carrier in phase relationship, having the frequency range of said parallel shunt condenser inductor circuit to near frequency range of said characteristic frequency response range of said tapped turn coils transmission line shunt condenser structure to regulate and reduce the slope frequency range of said structure whereby the said carrier is inserted at a position at base of said slope of said structure's resultant frequency response curve range thereby the said inserted carrier frequency will have a relatively small amplitude range and the resultant modulated components amplitude range from the low frequency modulated components to the high frequency modulated components will have relatively greater amplitude with no phase change when demodulated and said demodulated components will have greater amplitude with no phase shift of said modulated components from said carrier.

2. In a band pass filter system for controlling band pass frequency range with no phase shift of modulated intelligence, the structure comprising in combination an input signal source, a tapped turn input coil having a low impedance beginning point connected to said signal source, a tapped turn point near said low impedance and beginning point, and a high impedance end point connected to said signal source, a tapped turn output coil having a corresponding low impedance beginning point, a tapped turn point and an end point in uncoupled field relationship relative to said input coil, a low impedance transmission line coupling said input coil and said output coil at the said low impedance beginning and tapped turn points thereof, and resonance controlling shunt capacitors connected across the beginning and the end of each of said input coil and said output coil, whereby when a frequency response curve is obtained therefrom, the band width frequency is controlled by the magnitude of turns ratio between the said low impedance beginning points and said tapped turn points for a control of the inductive value across each end of said transmission line and each of the said coils simultaneously control the said band pass frequency ranges.

3. The structure of claim 2 including in the input coil circuit a tuning coil inductively coupled to said input coil circuit for controlling the frequency range of the band pass filter without absorbing energy of the band pass frequency range.

4. The structure of claim 2 wherein said input signal source is an amplifier having an output plate circuit and an input grid circuit, said input grid circuit comprising a control grid circuit including a grid coil having a high impedance end and a low impedance end, a grid coil shunt condenser, a series capacitor, and a grid return resistance connecting said grid to ground, and a parallel resonant circuit inductively coupled to the high impedance end of the said grid coil, and said grid coil circuit and said parallel resonant circuit having their low impedance ends connected together and to ground, whereby in producing a resultant response curve therefrom the combination is tuned to steepen the frequency range of the resultant response curve and increase the amplitude of a resultant response curve in which the said parallel resonant circuit will not absorb the slope range of frequencies in the resultant response curve.

5. In combination, with a television receiver system for mixing carriers of picture I.F. carrier and sound I.F. carrier to produce intercarrier sound with elimination of sound interference in a television display, a structure comprising a high frequency system including an input signal source, an input coil having a low impedance beginning point connected to said signal source, a tapped turn point near said low impedance beginning point and a high impedance end point connected to said signal source, a resonance controlling shunt capacitor connected across the said beginning and end of said input coil, an output coil having a corresponding low impedance beginning point, a tapped turn point and an end point, a resonance controlling shunt capacitor connected across the said beginning and end points of said output coil, a low impedance transmission line coupling said input coil at the said tapped turn points thereof and said output coil, an insulating blocking coupling capacitor in said transmission line, a video rectifier and output circuit connected to said ouput coil, said input signal source comprising a vacuum tube system including a plate element and circuit connected to said input coil, and a vacuum tube amplifier including a grid circuit having a grid coil shunt condenser inductively coupled to another grid coil shunt condenser.

6. In a single stage band pass filter system for tuning and preventing phase shift of transmitted carrier side bands with high Q of the coils substantially undisturbed, the structure comprising a signal source, a tapped turn input coil and circuit of variable inductance, with said coil having a high impedance end and a low impedance end connected to said signal source, a resonance shunt controlling capacitor across said input coil connected directly to the high impedance end and low impedance ends thereof, a tapped turn output coil and circuit of variable inductance with said coil magnetically shielded from said input coil and having a high impedance end and a low impedance end, a resonance shunt controlling capacitor across said output coil and connected directly to the high impedance end and low impedance ends thereof, and a low impedance coaxial transmission line and blocking condenser connecting said input coil at tapped turn points thereon and said output coil at tapped turn points thereon with said shunt capacitors determining the degree of coupling of the said tapped turn coils.

7. In a television receiver system of the intercarrier type having an intermediate frequency amplifier channel including a plurality of cascade connecting amplifier stages, means for impressing a television signal on the input of said channel, a picture carrier and a sound carrier, means for detecting the beat frequency of the difference in frequency between said picture carrier and said sound carrier, said intermediate frequency channel having an output stage including an output plate circuit and input grid circuit for said stage, the said plate circuit including two electrostatically and magnetically shielded tapped turn inductors each with high impedance ends and low impedance ends and each connected across their ends respectively with resonance controlling shunt condensers, a low impedance transmission line connecting and coupling the two tapped turn inductors at tapped turn points at the said low impedance ends of each inductor, with said resonance shunt condensers controlling the degree of coupling of said tapped turn coils, and the said grid circuit of the said output stage including a grid connected to a resistor to ground and through a capacitor to a grid coil resonant circuit shunted inductor coil and an inductively coupled condenser shunted inductor coil inductively coupled to said grid coil resonant circuit.

8. In a band pass control structure for transmission of high frequency carrier waves from an input circuit, a band pass filter to an output circuit comprising an input circuit and an output circuit, a circuit of two tapped turn inductors having relative high impedance ends and low impedance ends, variable shunt capacitors independently connected directly across each of said inductor's respective ends and a low impedance transmission line which connects and couples a portion of the two inductors together at their relative low impedance ends and each inductor will simultaneously tune both slopes of resultant frequency range to a characteristic frequency band range having carrier high frequency side bands and low frequency side bands and wherein the frequency response range will produce no phase shift of high frequency carrier side bands and low frequency carrier side bands.

9. In a band pass filter system for control of the frequency response range of signal source, the structure consisting of two tapped turn resonant inductors with resonance controlling shunt capacitors therefor and a transmission line in which the transmission line connects and couples the two resonant inductors with the said resonance shunt capacitors being independently connected at the beginning point of each resonant tapped turn coil and the end point of each tapped turn coil, whereby when the aforementioned structure is tuned to a frequency range to obtain simultaneously by each inductor a slight frequency movement at the low frequency side of slope and at the high frequency side of slope of the resultant frequency response curve, the characteristic frequency response range of the said structure is directly proportional to the increase in the inductive value at the aforementioned portion of each inductor for the same range of frequency.

10. In the control of the mutual coupling of two shunt condenser tapped turn inductors in a band pass frequency structure connected to a signal source, the arrangement consisting of two tap turn inductors with resonance controlling shunt condensers having capacity reactance independently connected directly across each inductor and a transmission line, in which the transmission line connects and inductively couples the two tapped turn inductors in isolated relationship at a portion of each inductor's tap turn and beginning of turn of each inductor, whereby when the arrangement is tuned to a frequency range in which each inductor will simultaneously produce a slight frequency movement at the low frequency side of slope and at the high frequency side of slope of the resultant frequency response curve, the magnitude of coupling of the two connected inductors is directly proportional to the increase in the capacity reactance value of the said inductor's shunt condensers at the same range of frequencies.

11. In a television receiver system of the type having an intermediate frequency amplifier channel including a plurality of cascade connecting amplifier stages, means for impressing a television signal on the input of said channel including a picture carrier having modulated components and a sound intermediate frequency carrier, means for detecting the modulated components and an output amplifier stage in said intermediate frequency channel in which the output amplifier stage consists of a plate output circuit and a grid input circuit in which the said output plate circuit consists of two tapped turn inductors with resonance controlling shunt capacitors independently connected across the said high and low ends respectively of each inductor and a transmission line in which the transmission line connects and couples the two tapped turn inductors at a tapped turn point at the beginning of a turn of each inductor, and when the said plate circuit is tuned to a frequency range in which each inductor will simultaneously produce a slight frequency movement on both slopes of a resultant frequency response curve of the said plate circuit, the input grid circuit of the said output amplifier stage consists of a grid connected to a resistor and through a condenser to a grid shunt inductor having a condenser shunted inductor inductively coupled to said grid inductor in which the coupled condenser shunted inductor's frequency range is tuned to attenuate the sound intermediate frequency carrier of the channel amplifier and the grid shunt inductor's frequency range is tuned toward an adjacent frequency range of the output plate circuit of said output amplifier resultant frequency response range until intermediate beat frequency and mixer in plate circuit cut off in plate circuit at I.-F. sound frequency and the resultant plate circuit response curve frequency range indicates the frequency range controlled by the said condenser shunted inductor appears to reflect energy of the response curve back to the grid shunt inductor's frequency control part of said resultant response curve increasing the amplitude of the slope of the frequency range the grid circuit controls, whereby when this effect is accomplished all of said modulated components of the picture carrier in the frequency range of the overall frequency response curve will have no phase shift and the linear length of the transmission line affects the detected modulated components and controls the leading edge and trailing edge of the demodulated components of the picture carrier.

12. In a television receiver system of the intercarrier type having an intermediate frequency amplifier channel including a plurality of cascade connecting amplifier stages means for impressing a television signal on the input of said channel, including a picture carrier and a sound carrier with means for detecting the beat frequency of the difference in frequency between picture carrier and sound carrier, said intermediate frequency channel having an output stage with an output plate circuit and an input grid circuit for said stage, in which the said plate circuit consists of two tapped turn coil inductors with high impedance ends and low impedance ends and resonance controlling shunt condensers across each inductor and a transmission line, in which the transmission line connects and couples the two tap turn inductors in isolated relationship at tapped turn points near the beginning of turn of each inductor coil, and the said plate circuit is tuned to a frequency range in which each inductor will simultaneously produce a slight frequency movement on both sides of the resultant frequency response curve of the said plate circuit; the input grid circuit of the said output stage consists of a grid connected resistor and shunt inductor and an inductively coupled condenser shunt inductor coupling in relation to the said grid resistor and shunt inductor of the said grid circuit of the output stage, whereby the degree of attenuation of the intermediate frequency sound carrier is controlled.

13. In the control of the characteristic frequency range of a band pass filter system, the structure consisting of two tapped turn resonant inductors with resonance controlling shunt condensers connected across said inductors and a low impedance transmission line and series coupling condenser in which the transmission line connects and inductively couples the said tapped turn inductors at tapped turn points near the beginning of turn of each inductor, in which, when the two tapped turn inductors, shunt condensers and the transmission line are tuned to a frequency range wherein each inductor will simultaneously produce a slight frequency movement on both sides of the resultant frequency response curve, the characteristic frequency range of the aforementioned structure will have a relatively small range of frequency in the slope portion of the response curve and the resultant frequency response range will be the only frequency response with all other adjacent frequencies cut off and all frequencies in between the slope range of frequency will be of relatively equal amplitude upon the proper capacity value of the said resonant capacitors.

References Cited in the file of this patent

UNITED STATES PATENTS

| | | |
|---|---|---|
| 2,326,515 | Bartelink | Aug. 10, 1943 |
| 2,360,475 | Chatterjea et al. | Oct. 17, 1944 |
| 2,585,717 | Achenback et al. | Feb. 12, 1952 |
| 2,745,066 | Marshall | May 8, 1956 |
| 2,785,300 | Spracklen | Mar. 12, 1957 |
| 2,810,014 | Squires | Oct. 15, 1957 |
| 2,863,940 | Kroger | Dec. 9, 1958 |
| 2,884,485 | Shlachter | Apr. 28, 1959 |